United States Patent
Sheth et al.

(10) Patent No.: US 11,617,368 B2
(45) Date of Patent: Apr. 4, 2023

(54) STABLE S-(+)-ABSCISIC ACID NONAQUEOUS LIQUID SOLUTIONS

(71) Applicant: Stoller Enterprises, Inc., Houston, TX (US)

(72) Inventors: Ritesh Bharat Sheth, Friendswood, TX (US); Maria Dollar, Tomball, TX (US); Francisco Javier Maldonado Gonzalez, Curico (CL)

(73) Assignee: Stoller Enterprises, Inc., Houston, TX (US)

( * ) Notice: Subject to any disclaimer, the term of this patent is extended or adjusted under 35 U.S.C. 154(b) by 0 days.

(21) Appl. No.: 17/708,947

(22) Filed: Mar. 30, 2022

(65) Prior Publication Data

US 2022/0369633 A1 Nov. 24, 2022

Related U.S. Application Data

(62) Division of application No. 17/534,320, filed on Nov. 23, 2021.

(60) Provisional application No. 63/184,963, filed on May 6, 2021.

(51) Int. Cl.
| | | |
|---|---|---|
| *A01N 37/42* | (2006.01) | |
| *A01N 25/02* | (2006.01) | |
| *A01N 25/22* | (2006.01) | |

(52) U.S. Cl.
CPC .................................. *A01N 37/42* (2013.01)

(58) Field of Classification Search
CPC combination set(s) only.
See application file for complete search history.

(56) References Cited

U.S. PATENT DOCUMENTS

| | | |
|---|---|---|
| 5,906,961 A | 5/1999 | Roberts |
| 8,454,982 B2 | 6/2013 | Wang |
| 10,667,511 B2 | 6/2020 | Figley |
| 2005/0288188 A1 | 12/2005 | Volgas |
| 2008/0207454 A1 | 8/2008 | Heiman |
| 2008/0254988 A1 | 10/2008 | Wang |
| 2009/0062120 A1 | 3/2009 | Sowa |
| 2009/0227453 A1 | 9/2009 | Bell |
| 2011/0166025 A1 | 7/2011 | Jentzer |
| 2012/0071555 A1 | 3/2012 | Herrero |
| 2015/0189875 A1 | 7/2015 | Devisetty et al. |
| 2016/0198714 A1 | 7/2016 | Stoller |
| 2018/0044254 A1 | 2/2018 | Gabrielson et al. |
| 2018/0303087 A1 | 10/2018 | Figley et al. |
| 2020/0029568 A1 | 1/2020 | Van Lith |

FOREIGN PATENT DOCUMENTS

| | | |
|---|---|---|
| CN | 102924172 | 2/2013 |
| CN | 103570442 | 2/2014 |
| CN | 102860319 | 4/2014 |
| CN | 106116829 | 11/2016 |
| CN | 106259405 | 1/2017 |
| FR | 2999385 | 12/2012 |
| GB | 2482299 | 2/2012 |
| WO | 2018183674 | 10/2018 |

OTHER PUBLICATIONS

Al-Khayri, Effect of Abscisic Acid and Polyethylene Glycol on the Synghronization of Somatic Embryo Development in Date Palm (*Phoenix dactylifera* L.), Biotechnology, 2013, p. 318-325, vol. 11.
Contego SL Plant Growth Regulator Soluble Liquid, California Department of Pesticide Regulation, Aug. 19, 2014, pp. 1-3, https://apps.cdpr.ca.gov/cgi-bin/label/pir.pl?prodno=66581.
Protone, Bioscience, pp. 1-4, https://www.valentbiosciences.com/cropenhancement/products/protone/.
Bionik, Bioscience, pp. 1-4, https://www.valentbiosciences.com/cropenhancement/products/bionik/.
Linossier, Effects of abscisic acid and high concentration of PEG on Hevea brasiliensis somatic embryos development, Plant Science, May 16, 1997, pp. 183-191, vol. 124, Issue 2.
Brabham, D.E. et al. "Cis-Trans Photoisomerization of Abscisic Acid", Photochemistry and photobiology, vol. 34, pp. 33-37 (1981).
Gronwald, O. et. al.. "AGNIQUE AMD 3L as green solvent for polyethersulfone ultrafiltration membrane preparation," Journal Applied Polymer Science, 48419, pp. 1-12 (2020).
Randova, A. et al. "A fundamental study of the physicochemical properties of Rhodiasolv Polarclean: A promising alternative to common and hazardous solvents," Journal of Molecular Liquids, vol. 224, pp. 1163-1171 (2016).

*Primary Examiner* — John Pak
(74) *Attorney, Agent, or Firm* — Yancy IP Law, PLLC

(57) ABSTRACT

Stable S-(+)-abscisic acid (S-ABA) non-aqueous liquid solutions are generally achieved without the use of an effective amount of an antioxidant and/or an ultraviolet absorber to S-(+)-abscisic acid. In a preferred embodiment, the stable S-(+)-abscisic acid (S-ABA) nonaqueous liquid solutions includes at least one organic solvent, such as at least one polyethylene glycol, at least one glycol, and/or at least one lactamide and/or at least one pentanoate.

9 Claims, 1 Drawing Sheet

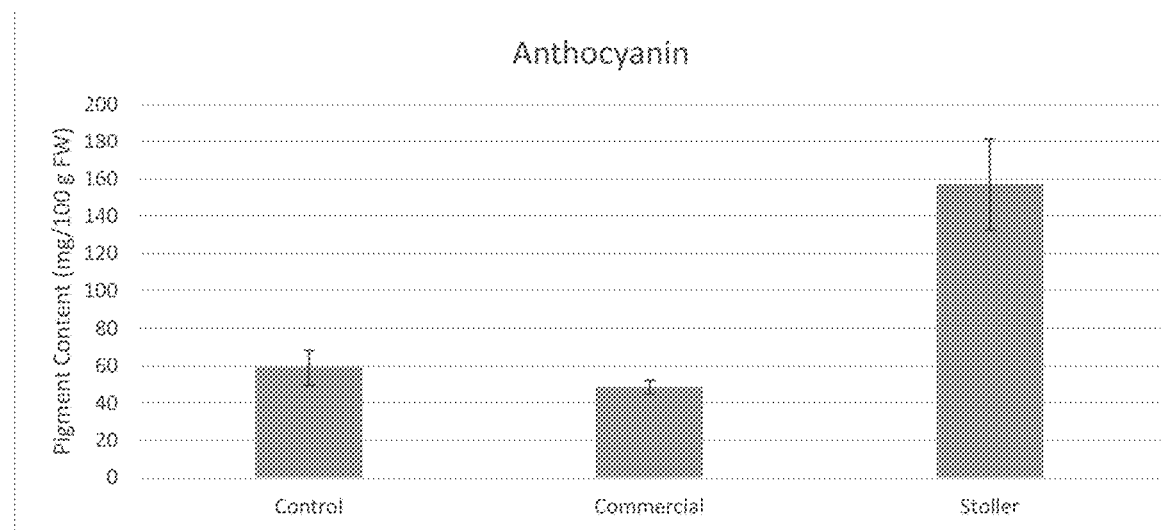

STABLE S-(+)-ABSCISIC ACID NONAQUEOUS LIQUID SOLUTIONS

CROSS REFERENCE TO RELATED APPLICATION

This application claims the benefit, under 35 U.S.C. 119(e), of U.S. Provisional Application No. 63/184,963 filed May 6, 2021, the contents of which are incorporated herein by reference. This application is a divisional application of U.S. patent application Ser. No. 17/534,320 filed Nov. 23, 2021, the entirety of the divisional application is incorporated herein by reference.

FIELD OF THE INVENTION

The present invention generally relates to stable S-(+)-abscisic acid nonaqueous liquid solutions. Preferably, the liquid solutions do not include an effective amount of any UV absorbers and/or antioxidants.

BACKGROUND OF THE INVENTION

Abscisic acid is a naturally occurring plant hormone which acts primarily to inhibit growth, maintain dormancy of buds, promote fruit maturation or coloration, activate the pathogen resistance response defense, induce senescence in already-damaged cells and their proximate neighbors, and help the plant tolerate stressful conditions.

The naturally occurring form of abscisic acid is S-(+)-abscisic acid. It has been reported that R-(−)-abscisic acid also has some biological activities. The side chain of naturally occurring abscisic acid is by definition 2-cis-4-trans.

Abscisic acid was first defined in the early 1960s as a growth inhibitor accumulating in abscising cotton fruit and leaves of sycamore trees photoperiodically induced to become dormant. Since then, abscisic acid has been shown to regulate many aspects of plant growth and development, including embryo maturation, seed dormancy, germination, cell division and elongation. Although abscisic acid has historically been thought of as a growth inhibitor, young tissues have high abscisic acid levels, and abscisic acid-deficient mutant plants are severely stunted because their ability to reduce transpiration and establish turgor is impaired. Exogenous abscisic acid treatment of mutants restores normal cell expansion and growth.

Abscisic acid is thought to initiate its effects on cells through binding to receptor proteins, although their identities and locations are still largely unknown. Activation of the putative receptor(s) causes a chain of events that results in rapid changes in ion channels and slower changes in the pattern of gene transcription. While many individual components of this chain of events have been identified, a complete picture has not yet been obtained.

Commercial formulations comprising abscisic acid are used in the agricultural industry for various purposes, such as to increase crop yield, to advance fruit maturity and color development, to improve stress tolerance, to slow the growth rate, to adjust the flowering phase and for other uses. Abscisic acid has also been reported to possess insect inhibition qualities. Abscisic acid in a powdered form is currently commercially available from multiple Chinese vendors which market it as a substance that, among other uses, improves the yield and quality of certain crops.

Several liquid formulations containing S-(+)-abscisic acid in an aqueous media are known. The bioactive molecule may be combined with the addition of an organic base. Alternatively, the bioactive ingredients is used with anti-freezing agents in an aqueous media. Some formulations use aqueous S-(+)-abscisic acid liquid formulas with stabilizers. A formulation is known that includes the active agrochemical ingredient with a surfactant present in a quantity equal to or greater than the active agrochemical ingredient.

However, one of the problems associated with industrial use of abscisic acid formulations is relatively poor storage stability of solvent-based abscisic acid liquid formulations caused by hydroxylation (inactivation) of 8' and 9' methyl groups in plants and sunlight induced degradation and isomerization of active 2-cis, 4-trans-S-(+) abscisic acid into the inactive 2-trans, 4-trans-S-(+)-abscisic acid isomer.

It has been demonstrated that the use of a granule and/or liquid formulation provided a solution to the stability issues by adding an effective amount of at least one antioxidant and an ultraviolet absorber. It was reported that without at least one antioxidant, storage stability of 2-cis,4-trans-(S)-abscisic acid was not observed. Also, it was reported that without antioxidants, S-ABA degrades over time; probably, the reason is due to oxidative degradation of the S-ABA molecule which has a highly conjugated structure. In addition, the active 2-cis,4-trans-(S)-abscisic acid tends to izomerize into the inactive 2-trans,4-trans-(S) isomer. It was reported that the addition of an ultraviolet absorber greatly slows down the isomerization.

The current marketplace for S-ABA soluble solutions is limited to an aqueous based formulation at 10% active ingredient content. Higher concentrations of aqueous based material nor that of solvent based material have been identified due to the poor solubility of S-ABA in these solvents.

Therefore, there is still an unmet need in the art for stable S-(+)-abscisic acid formulations for commercial applications that do not need at least one antioxidant and/or an ultraviolet absorber as well as for the development of low-VOC liquid formulations containing S-ABA to meet regulatory requirements.

SUMMARY OF THE INVENTION

The present invention is generally directed to stable S-(+)-abscisic acid (S-ABA) nonaqueous liquid solutions including at least one organic solvent. The stable nonaqueous liquid solutions are generally achieved without the use of an effective amount of an antioxidant and/or an ultraviolet absorber to S-(+)-abscisic acid. In one embodiment of the present invention the stable S-(+)-abscisic acid (S-ABA) nonaqueous liquid solutions includes at least one polyethylene glycol, such as polyethylene glycol (PEG 200). In another embodiment of the present invention, the stable S-(+)-abscisic acid (S-ABA) nonaqueous liquid solutions includes at least one glycol, such as propylene glycol. In another embodiment of the present invention, the stable S-(+)-abscisic acid (S-ABA) nonaqueous liquid solutions includes at least one lactamide, such as N,N-dimethyl lactamide. In another embodiment of the present invention, the stable S-(+)-abscisic acid (S-ABA) nonaqueous liquid solutions includes at least one pentanoate, such as methyl-5-dimethylamino-2-methyl-5-oxopentanoate.

The present invention is also directed to nonaqueous liquid solutions comprising an effective amount of 2-cis, 4-trans-(S)-abscisic acid in conjunction with an effective amount of another plant growth regulator. Preferably, this nonaqueous liquid solution does not include an effective amount of any antioxidant and/or any ultraviolet absorber.

BRIEF DESCRIPTION OF THE DRAWINGS

The features and advantages of the present invention will become apparent from the following detailed description of a preferred embodiment thereof, taken in conjunction with the accompanying drawings, in which:

FIG. 1 is a graph showing the anthocyanin content in grapes for a control treatment, commercial treatment, and treatment with the present invention ("Stoller").

DETAILED DESCRIPTION OF THE INVENTION

The present invention relates to stable S-(+)-abscisic acid nonaqueous liquid solutions and methods of using these solutions to improve the storage and light stability of 2-cis, 4-trans-(S)-abscisic acid. More specifically, the present invention relates to methods of improving the storage stability and the photochemical stability of 2-cis, 4-trans-(S)-abscisic acid in a nonaqueous solution without the addition of an effective amount of at least one antioxidant and/or an ultraviolet (UV) absorber to the solution.

In a preferred embodiment, the stable S-(+)-abscisic acid (S-ABA) nonaqueous liquid solution includes about 20 to 99.9 wt. % of at least one organic solvent. Preferably, the organic solvent is at least one polyethylene glycol, or at least one glycol, or at least one lactamide, or at least one pentanoate. In one embodiment, the organic solvent is a low volatile organic compounds (VOC) solvent. Low VOC stable liquid formulations are generally achieved by using a low VOC solvent system. On May 30, 2006, the California Department of Pesticide Regulation (DPR) announced an air quality initiative to reduce pesticide-related emissions of volatile organic compounds (VOC). All pesticide formulations sold in California require <30% VOC content as estimated by thermogravimetry analysis (TGA). Therefore, a low VOC solvent system designated above would meet the DPR requirements. Generally, the nonaqueous liquid solution of the present invention has a low level of volatile organic chemicals such that the vapor pressure of the nonaqueous liquid solution is less than 0.08 mm Hg at 20° C. or the nonaqueous liquid solution has a volatile organic chemical (VOC) emission potential of 25%.

Preferred low VOC solvent systems are based upon high boiling point solvents such as polyethylene glycol of equal or less than 400 molecular weight, preferably 190-400 molecular weight, preferably 190-310 molecular weight, and more preferable 190-210 molecular weight. Low VOC solvents such as polyethylene glycol (PEG 200) can be used in the nonaqueous liquid solution of the present invention. A mixture of PEG200 with other polar aprotic solvents can also be used. Such polar aprotic solvents include, but are not limited to alcohols, dialkyl ketones, alkylene carbonates, alkyl esters, and aryl esters.

In one embodiment, the nonaqueous liquid solution includes at least one non-aqueous co-solvent. The non-aqueous co-solvents are selected from the group consisting of ethanol, n-propanol, iso-propanol, ethyl lactate, 3 ethyl hydroxybutrate, 3 propyl hydroxybutyrate, glycols, glycerols, polyethylene glycols, polypropylene glycols, propylene carbonates, lactamides, pentanoates and further combinations thereof. In one embodiment, the nonaqueous liquid solution includes 0 to about 50 wt. % non-aqueous co-solvent.

Abscisic acid is an optically active 15-C weak acid with 8', 9' and 10' CH3 groups in the ring. The structural formula of abscisic acid is set forth below:

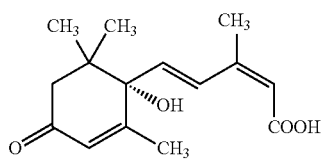 [SMILES: CC1=CC(=O)CC(C)(C)[C@@]1(O)/C=C/C(C)=C\C(=O)O]

The nonaqueous liquid solution of the present invention utilize the S-(+) enantiomer rather than a racemic mixture of stereoisomers. Unless expressly stated otherwise, in all instances when the application refers to abscisic acid, it refers to S-(+)-abscisic acid.

As used herein, the term "antioxidant" means any chemical or biological compound or substance that inhibits oxidation. Antioxidants include, but are not limited to, t-butyl-hydroquinone (TBHQ), propyl gallate, clove oil, and/or ethoxyquin.

As used herein, the term "UV absorber" means any chemical compound or substance that acts to absorb UV light in order to reduce the degradation and the isomerization of 2-cis, 4-trans-(S)-ABA caused by UV radiation. UV absorbers include, but are not limited to, benzophone-3 and/or ethylhexyl methoxycinnamate.

The phrase "effective amount" of an antioxidant or an ultraviolet absorber means a nontoxic but sufficient amount of antioxidant or UV absorber to provide the desired effect. The amount of antioxidant or ultraviolet absorber that is "effective" will vary from composition to composition, depending on the particular composition, the particular antioxidant or ultraviolet absorber, and the like. Thus, it is not always possible to specify an exact "effective amount." However, an appropriate "effective amount" in any individual case may be determined by one of ordinary skill in the art using routine experimentation. This amount is generally at least 0.1 weight % of the antioxidant and at least 0.1 weight % UV absorber based upon the total weight of the solution.

A preferred nonaqueous liquid solution of the present invention comprises from 0.001 to 40 weight % of at least one form of abscisic acid, such as S-ABA, or 0.001 to 25 weight. %, or 1 to 25 weight %, or 1 to 20.5 weight %, or 0.001 to 10 weight %. These nonaqueous liquid solutions include less than 0.1 wt. % antioxidant, or less than 0.08 wt. % antioxidant, or less than 0.05 wt. % antioxidant; and less than 0.1 wt. % UV absorber, or less than 0.08 wt. % UV absorber, or less than 0.05 wt. % UV absorber. The nonaqueous liquid solution can also contain from 0 to 20 weight % surfactant and will contain from 75 to 99.9 weight % of at least one organic solvent, or 50-80 wt. % of at least one organic solvent, or 75-95 wt. % of at least one organic solvent. The nonaqueous liquid solution can also contain from 0 to 50 weight % co-solvent. The nonaqueous liquid solution can then be diluted prior to use as is well known in the art to apply an effective amount of S-ABA to plants being treated as is hereinafter discussed.

In one embodiment of the present invention, the nonaqueous liquid solution includes about 10-20.5 wt. % of one form of ABA, such as S-ABA, and about 79.5-90 wt. % polyethylene glycol.

The term "nonaqueous" means that the stable nonaqueous liquid solution contains ≤10 wt. % water, more preferably ≤5 wt. % water, more preferably ≤2.5 wt. % water, and more preferably ≤1 wt. % water.

In a preferred embodiment, the stable nonaqueous liquid solution would also include an effective amount of a surfactant to improve wetting, spray retention and penetration of S-ABA in use dilutions. In one embodiment, the non-aqueous liquid solution includes 0 to about 20 wt. % of at least one surfactant. The surfactant includes, but are not limited to, the group consisting of carboxylates, sulfonates, natural oils, alkylamides, arylamides, alkylphenols, arylphenols, ethoxylated alcohols, polyoxygethylene, carboxylic esters, polyalkylglycol esters, anhydrosorbitols, glycol esters, carboxylic amides, monoalkanolamine, poloxyethylene fatty acid amides, polysorbates, cyclodextrins, sugar based, silicone based, polyalkylated alcohols, and alkylaryl ethoxylates. Surfactants that could be used include, but are not limited to, sorbitan derivatives such as Tween® 80, Tween®85 (Tween® is a registered trademark of Croda Americas, Inc., Tween®80 and 85 are available from Croda, Inc.), ethoxylated alcohols such as Brij®98 (Brij® is a registered trademark of Uniqema Americas LLC, Brij® 98 is available from Croda Inc.), ethoxylated alkylphenols such as Igepol CA-630, Igepol, and Igepol CO-630 from Rhodia Inc., ethoxylated fatty acids such as Myrj® 52 (Myrj® is a registered trademark of Atlas Powder Company, Myrj® 52 is available from Croda Inc.), silicone based surfactants such as Silwet L-77® (Silwet and Silwet L-77 are registered trademarks of Momentive Performance Chemicals, Silwet L-77® is available from Momentive Performance Chemicals), and block polymeric surfactants such as Pluronic® P85 and Pluronic® P104 (Pluronic is a registered trademark of BASF Corporation, Pluronic® P85 and P104 are available from BASF Corporation).

It should be understood the recitation of a range of values includes all of the specific values in between the highest and lowest value. For example, the recitation of "0.001 to 40 weight % S-ABA" includes all of the values between about 0.001 to about 40 such that either the upper or lower limits may include, but are not limited to, 0.001, 0.005, 0.01, 0.05, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40. For example, the recitation of "less than 0.1 wt. %" antioxidant and UV absorber, includes all of the values between 0-0.1 wt. % such that either the upper or lower limits may include, but are not limited to, 0, 0.01, 0.02, 0.03, 0.04, 0.05, 0.06, 0.07, 0.08, 0.09. and 0.10. For example, the recitation of "0 to 20 weight % surfactant" includes all of the values between 0 and 20 such that either the upper or lower limits may include, but are not limited to, 0, 1, 2, 3, 4, 5, 6, 7, 8, 9, 10, 11, 12, 13, 14, 15, 16, 17, 18, 19, and 20. For example, the recitation of "20 to 99.9 weight %" organic solvent includes all of the values between 20 and 99.9 such that either the upper or lower limits may include, but are not limited to, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 and 99.9. For example, the recitation of "less than 10 wt. % water" includes all of the values between 0 and 10 wt. % such that either the upper or lower limits may include, but are not limited to, 0, 1, 2, 3, 4, 5, 6, 7, 8, 9 and 10. For example, the recitation of "0 to about 50 wt. % non-aqueous co-solvent" and includes all of the values between 0 and 50 such that either the upper or lower limits may include, but are not limited to, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50.

In another embodiment, the present invention also relates to liquid solutions comprising an effective amount of 2-cis, 4-trans-(S)-abscisic acid and an effective amount of another plant growth regulator and/or another plant nutrient. Preferably, this solution does not include an effective amount of any antioxidant and/or UV stabilizer. In a preferred embodiment, the other plant growth regulator is selected from the group consisting of gibberellic acid ($GA_3$), 6-benzyladenine (6-BA), Kinetin, Indole-3-Butyric Acid (IBA), Indole-3-Acetic Acid (IAA), Salicylic acid (SA) and/or N-(2-chloro-4-pyridinyl)-N'-phenylurea (CPPU). In a preferred embodiment, the other plant nutrient is selected from a group of compounds including nitrogen, phosphorus, potassium, calcium, magnesium, sulfur, boron, copper, iron, manganese, molybdenum, and/or zinc. For example, the plant nutrient may be boric acid and/or sodium molybdate. The mixtures of S-ABA with other plant growth regulators can improve plant growth, crop yield, stress tolerance, and disease resistance, as well as promote floral bud initiation and flowering. In a preferred embodiment, the liquid solution includes ≤25 wt. % additional plant growth regulators, or ≤20 wt. %, or ≤15 wt. %, or ≤10 wt. %, or ≤5 wt. %, or ≤1 wt. %. In a preferred embodiment, the liquid solution includes ≤25 wt. % additional plant nutrients, or ≤20 wt. %, or ≤15 wt. %, or ≤10 wt. %, or ≤5 wt. %, or ≤1 wt. %.

Nonaqueous liquid solutions of the present invention can be prepared as either ready-to-use dilutions or dilutable concentrates. The dilutable concentrates can be diluted to a final application concentration or to any intermediate dilution, without risk of precipitation of the active ingredient. The nonaqueous liquid solutions according to the present invention are inexpensive to manufacture, stable under storage and shipping conditions, and are safe to handle and use. A person having ordinary skill in the art would be able to determine how to prepare the dilutions without undue experimentation.

(S)-(+)-abscisic acid has various agricultural applications. For example, formulations of this invention may be used to improve stress tolerance of plants, slow the growth rate, adjust the flowering phase, treat seeds, inhibit the growth of stalk leaf, prevent pre-harvest fruit and flower drop, improve the quality and color of fruits, etc. It is beneficial and highly useful for nonaqueous liquid formulations of abscisic acid to be stable for a long period of time, saving the end user's time and money associated with buying new formulations. Possible uses would include, for example, distribution and sale of nonaqueous liquid solutions comprising (S)-(+)-abscisic acid without effective amounts of any antioxidant and/or any UV absorber according to the present invention. The end user could then store the nonaqueous liquid solution for a prolonged period of time.

As used herein, all numerical values relating to amounts, weight percentages and the like, are defined as "about" or "approximately" each particular value plus or minus 10%. For example, the phrase "greater than 0.1%" is to be understood as encompassing values greater than 0.09%. Therefore, amounts within 10% of the claimed values are encompassed by the scope of the claims.

In a preferred embodiment, the non-aqueous liquid solution comprises, consists of, or consists essentially of: a) about 0.001 to about 40 wt. %, or about 0.001 to about 25 wt. %, or about 0.001 to about 10 wt. %, of least one form of S-(+)abscisic acid (S-ABA); b) about 20 to 99.9 wt. %, or about 40 to 99.9 wt. %, of at least one organic solvent; c) optionally, 0 to about 50 wt. % of at least one non-aqueous co-solvent; d) optionally, 0 to about 20 wt. % at least one surfactant, e) optionally, additional plant growth regulator(s), f) optionally, additional plant nutrients; g) less than 0.1 wt. % antioxidant, h) less than 0.1 wt. % UV absorber, and i) ≤10 wt. % water, preferably ≤5 wt. % water. Preferably, the at least one organic solvent is at least one polyethylene glycol, and/or at least one glycol, and/or at least one lactamide, and/or at least one pentanoate. In one embodiment of the present invention, the at least one organic solvent is polyethylene glycol 200 (PEG 200). In one embodiment of the present invention, the at least one organic solvent is propylene glycol. In one embodiment of the present invention, the at least one organic solvent is N,N-dimethyl lactamide. In one embodiment of the present invention, the at least one organic solvent is methyl-5-dimethylamino-2-methyl-5-oxopentanoate.

In a preferred embodiment, the non-aqueous liquid solution consists of, or consists essentially of: a) about 0.001 to about 40 wt. %, or about 0.001 to about 25 wt. %, or about 0.001 to about 10 wt. %, of least one form of S-(+) abscisic acid (S-ABA); b) about 20 to 99.9 wt. %, or about 40 to 99.9 wt. %, of at least one organic solvent; c) optionally, 0 to about 50 wt. % of at least one non-aqueous co-solvent; d) optionally, 0 to about 20 wt. % at least one surfactant, e) optionally, additional plant growth regulator(s), f) optionally, additional plant nutrients; g) less than 0.1 wt. % antioxidant, h) less than 0.1 wt. % UV absorber, i) ≤10 wt. % water, preferably ≤5 wt. % water; and j) <10 wt. % other ingredients, or <5 wt. % other ingredients, or <1 wt. % other ingredients. Wherein said "other ingredients" is any material which does not affect the basic and novel properties of the claimed solution. Such "basic and novel properties" include, but are not limited to, stability performance as provided in the EPA, Food and Agriculture Organization of the United Nations (FAO) and World Health Organization (WHO) Guidelines cited below. Preferably, the at least one organic solvent is at least one polyethylene glycol, and/or propylene glycol, and/or at least one lactamide, and/or at least one pentanoate. In one embodiment of the present invention, the at least one organic solvent is polyethylene glycol 200 (PEG 200). In one embodiment of the present invention, the at least one organic solvent is propylene glycol. In one embodiment of the present invention, the at least one organic solvent is N,N-dimethyl lactamide. In one embodiment of the present invention, the at least one organic solvent is methyl-5-dimethylamino-2-methyl-5-oxopentanoate.

The following examples are intended to illustrate the present invention and to teach one of ordinary skill in the art how to make and use the invention. They are not intended to limit the invention or its protection in any way.

Example 1: Stability of 1 wt % S-ABA Formulations

TABLE 1

| Ingredients (wt. %) | A | B | C | D |
|---|---|---|---|---|
| (S)-ABA | 1.11 | 1.11 | 1.11 | 1.11 |
| Propylene Glycol | 98.89 | | | |
| Polyethyene Glycol 200 | | 98.89 | | |
| Polyethyene Glycol 300 | | | 98.89 | |
| Polyethyene Glycol 400 | | | | 98.89 |
| Water Content Measured | 0.20% | 0.26% | 0.17% | 0.20% |

Four formulations of 1.11% S-ABA were prepared by dissolving S-ABA in various glycol solvents at room temperature without the use of stabilizers and antioxidants as set forth in Table 1 above. The EPA Guidelines on Stability that issued on Nov. 16, 2012 to the Office of Pesticide Programs (OPP) relating to "Accelerated Storage Stability and Corrosion Characteristics Study Protocol", which are incorporated herein by reference, were followed using clear bottles to allow for UV radiation to be available to the solutions. As provided in the EPA, FAO, and WHO Guidelines, accelerated storage stability can be used to fulfill EPA and multinational regulatory data requirements. OPP has determined that this study, conducted for 14 days at an elevated temperature (54° C.), provides adequate data in certain circumstances to allow EPA to make a regulatory finding regarding the stability of the product and the effect of the formulation on the product packaging. The Manual on the Development and Use of FAO and WHO Specifications for Pesticides, the contents of which are incorporated herein by reference, cites the tolerance for active ingredient in a formulated product is +/−5% for active ingredient content in formulation of 25-50%, +/−6% for active ingredient content in formulation of 10-25% and >+/−10% for formulations with less than 2.5% active content. The "Manual on the Development and Use of FAO and WHO Specifications for Pesticides" also provides that the average active ingredient content should not decline to less than 95% of the average content measured prior to the storage stability performed at 54±2° C. for 14 days. The results are summarized in Table 2 below:

TABLE 2

| | Amount of S-ABA as Measured by HPLC Assay (wt. %) | | | |
|---|---|---|---|---|
| | A | B | C | D |
| Initial | 100% | 100% | 100% | 100% |
| 54 C./14 Days | 92.7% | 95.01% | 98.18% | 98.18% |

As Table 2 demonstrates, Formulation A, which contains propylene glycol showed significant degradation of S-ABA during Accelerated Storage Stability. Utilizing the current inventive solution, less than 5% degradation was observed.

Example 2: Stability of 10+Wt. % S-ABA Formulations

TABLE 3

| Ingredients (wt. %) | E | F | G | H |
|---|---|---|---|---|
| (S)-ABA | 10.26 | 10.21 | 10.28 | 10.26 |
| Propylene Glycol | 89.74 | | | |
| Polyethyene Glycol 200 | | 89.79 | | |
| Polyethyene Glycol 300 | | | 89.72 | |
| Polyethyene Glycol 400 | | | | 89.74 |
| Water Content Measured | 0.67% | 0.43% | 0.43% | 0.34% |

Four formulations of 10+wt. % S-ABA were prepared in various glycol solvents without the use of stabilizers and anti-oxidants by heating the S-ABA above room temperature in the solvent at <90° C. as set forth in Table 3 above.

Accelerated Stability Testing was also performed on these solutions. The results are summarized in Table 4 below:

TABLE 4

Amount of S-ABA (wt. %) as Measured by HPLC Assay

|  | E | F | G | H |
|---|---|---|---|---|
| Initial | 10.26 | 10.21 | 10.28 | 10.26 |
| Day 0 | 10.00 | 10.21 | 10.28 | 10.25 |
| Day 14 | 9.71 | 9.95 | 9.91 | 9.85 |
| % Loss from Initial | 5.36 | 2.55 | 3.60 | 4.00 |

As Table 4 demonstrates, Formulation F-H, which contains polyethylene glycol showed minimal degradation of S-ABA during Accelerated Storage Stability.

Example 3: High Concentration ABA Solutions Using Glycol Solvents

TABLE 5

| Ingredients (wt. %) | I | J | K | L |
|---|---|---|---|---|
| (S)-ABA | 14.63 | 21.0 | 18.1 | 15.6 |
| Propylene Glycol | 85.37 | | | |
| Polyethyene Glycol 200 | | 79.0 | | |
| Polyethyene Glycol 300 | | | 81.9 | |
| Polyethyene Glycol 400 | | | | 84.4 |
| Water Content Measured | 1.08% | 0.33% | 0.27% | 0.54% |

Four formulations of >10 wt. % S-ABA were prepared in various glycol solvents without the use of stabilizers and anti-oxidants by heating the S-ABA above room temperature in the solvent at <90° C. as set forth in Table 5 above. Accelerated Stability Testing was also performed on these solutions. The results are summarized in Table 6 below:

TABLE 6

Amount of S-ABA (wt. %) as Measured by HPLC Assay

|  | I | J | K | L |
|---|---|---|---|---|
| Initial | 14.63 | 21.03 | 18.08 | 15.56 |
| Day 0 | 13.78 | 20.72 | 17.86 | 15.08 |
| 54 C./14 Days | 13.48 | 20.31 | 17.36 | 14.98 |
| % Loss from Initial | 7.86 | 3.42 | 3.98 | 3.73 |

As Table 6 illustrates, Formulation J-L, which contains polyethylene glycol showed minimal degradation of S-ABA during Accelerated Storage Stability.

Example 4: High Concentration ABA Solutions Using Co-Solvents

TABLE 7

| Ingredients (wt. %) | M | N | O | P | Q | R | S | T |
|---|---|---|---|---|---|---|---|---|
| (S)-ABA | 18.13 | 18.19 | 18.20 | 18.21 | 18.21 | 18.19 | 18.01 | 18.01 |
| Polyethyene Glycol 200 | 73.68 | 73.63 | 73.62 | 73.62 | 73.61 | 73.63 | 73.79 | 73.79 |
| Polyethyene Glycol 300 | 8.19 | | | | | | | |
| Polyethyene Glycol 400 | | 8.18 | | | | | | |
| Propylene Glycol | | | 8.18 | | | | | |
| Methanol | | | | 8.18 | | | | |
| Ethanol | | | | | 8.18 | | | |
| Isopropanol | | | | | | 8.18 | | |
| N,N-Dimethyl Lactamide | | | | | | | 8.20 | |
| Methyl-5-Dimethylamino-2-Methyl-5-Oxopentanoate | | | | | | | | 8.20 |
| Water Content Measured | 0.32% | 0.36% | 0.38% | 0.38% | 0.37% | 0.41% | 1.11% | 1.14% |

Eight formulations of ~18 wt. % S-ABA were prepared in various co-solvents without the use of stabilizers and anti-oxidants by heating the S-ABA above room temperature in the co-solvents at <90° C. as set forth in Table 7 above. Accelerated Stability Testing was also performed on these solutions. The results are summarized in Table 8 below:

TABLE 8

Amount of S-ABA (wt. %) as Measured by HPLC Assay

|  | M | N | O | P | Q | R | S | T |
|---|---|---|---|---|---|---|---|---|
| Initial | 18.13 | 18.19 | 18.20 | 18.21 | 18.21 | 18.19 | 18.01 | 18.01 |
| Day 0 | 18.10 | 18.19 | 18.21 | 18.81 | 18.58 | 18.67 | 17.90 | 17.91 |
| 54 C./14 Days | 17.96 | 17.68 | 17.65 | 18.48 | 18.40 | 18.44 | 17.66 | 17.56 |
| % Loss from Initial | 0.95 | 2.82 | 3.00 | | | | 1.95 | 2.49 |
| % Loss from Day 0* | | | | 1.75 | 0.97 | 1.23 | | |

As Table 8 illustrates, Formulation M-T, showed minimal degradation of S-ABA during Accelerated Storage Stability. Some evaporation was observed of the lower boiling co-solvents which led to slightly higher Day 0 results.

Example 5: High Concentration ABA Solutions Using Higher Concentrations of Co-Solvents

TABLE 9

| Ingredients (wt. %) | AA | AB | AC | AD | AE | AF |
|---|---|---|---|---|---|---|
| (S)-ABA | 18.20 | 18.20 | 18.20 | 18.20 | 18.08 | 18.20 |
| Polyethyene Glycol 200 | 53.17 | 53.17 | 53.17 | 53.17 | 53.25 | 53.17 |
| Polyethyene Glycol 300 | 28.63 | | | | | |
| Polyethyene Glycol 400 | | 28.63 | | | | |
| Propylene Glycol | | | 28.63 | | | |
| Propylene Carbonate | | | | 28.63 | | |
| N,N-Dimethyl Lactamide | | | | | 28.67 | |
| Methyl-5-Dimethylamino-2-Methyl-5-Oxopentanoate | | | | | | 28.63 |
| Water Content Measured | 0.72% | 0.69% | 0.43% | 0.31% | 0.42% | 0.49% |

Six more formulations of ~18 wt. % S-ABA were prepared utilizing higher concentrations of various co-solvents without the use of stabilizers and anti-oxidants by heating the S-ABA above room temperature in the co-solvents at <90° C. as set forth in Table 9 above. Accelerated Stability Testing was also performed on these solutions. The results are summarized in Table 10 below:

TABLE 10

Amount of S-ABA (wt. %) as Measured by HPLC Assay

| | AA | AB | AC | AD | AE | AF |
|---|---|---|---|---|---|---|
| Initial | 18.20 | 18.20 | 18.20 | 18.20 | 18.08 | 18.20 |
| Day 0 | 18.08 | 18.20 | 18.20 | 18.20 | 18.08 | 18.20 |
| 54 C./14 Days | 17.39 | 17.34 | 17.75 | 1747 | 17.57 | 17.81 |
| % Loss from Initial | 4.44 | 4.72 | 2.49 | 4.01 | 2.80 | 2.14 |

As Table 10 illustrates, Formulation AA-AF, showed minimal degradation of S-ABA during Accelerated Storage Stability.

Example 6: High Concentration ABA Solutions Containing Various Concentrations of Water

TABLE 11

| Ingredients (wt. %) | U | V | W | X |
|---|---|---|---|---|
| (S)-ABA | 10.11 | 10.12 | 10.12 | 10.11 |
| Polyethyene Glycol 200/Water Mix | 89.89 | 89.88 | 89.88 | 89.89 |
| Water Content Measured | 0.61% | 2.13% | 3.91% | 7.26% |

Four formulations of ~10 wt. % S-ABA were prepared in PEG 200 containing various amounts of water without the use of stabilizers and anti-oxidants by heating the S-ABA above room temperature in the co-solvents at <90° C. as set forth in Table 11 above. Accelerated Stability Testing was also performed on these solutions. The results are summarized in Table 12 below:

TABLE 12

Amount of S-ABA (wt. %) as Measured by HPLC Assay

| | U | V | W | X |
|---|---|---|---|---|
| Initial | 10.11 | 10.12 | 10.12 | 10.11 |
| Day 0 | 10.11 | 10.14 | 10.14 | 10.34 |
| 54 C./14 Days | 9.85 | 9.70 | 9.69 | 9.72 |
| % Loss from Day 0 | 2.57 | 4.34 | 4.44 | 6.00 |

As Table 12 illustrates, Formulation U-W, showed minimal degradation of S-ABA during Accelerated Storage Stability. Concentrations of water above 5% as in Formulation X demonstrated >5% loss of ABA. Some evaporation was observed of water which led to slightly higher Day 0 results.

Example 7: High Concentration ABA Solutions Using Non-Glycol Solvents

TABLE 13

| Ingredients (wt. %) | Y | Z |
|---|---|---|
| (S)-ABA | 40.00 | 40.00 |
| N,N-Dimethyl Lactamide | 60.00 | |
| Methyl-5-Dimethylamino-2-Methyl-5-Oxopentanoate | | 60.00 |
| Water Content Measured | 0.58% | 0.39% |

Two formulations of ~40 wt. % S-ABA were prepared in various non-glycol solvents without the use of stabilizers and anti-oxidants by heating the S-ABA above room temperature in the solvent at <90° C. as set forth in Table 13 above. Accelerated Stability Testing was also performed on these solutions. The results are summarized in Table 14 below:

TABLE 14

Amount of S-ABA (wt. %) as Measured by HPLC Assay

| | Y | Z |
|---|---|---|
| Initial | 40.06 | 40.05 |
| Day 0 | 39.98 | 39.95 |
| 54 C./14 Days | 38.46 | 38.66 |
| % Loss from Initial | 4.00 | 3.48 |

As Table 14 illustrates, Formulation Y and Z, which contains high ABA concentrations and are using non-glycol solvents showed minimal degradation of S-ABA during Accelerated Storage Stability.

Example 8: High Concentration ABA Solutions with Various Surfactants

TABLE 15

| Ingredients (wt. %) | AG | AH | AI | AJ |
| --- | --- | --- | --- | --- |
| (S)-ABA | 20.00 | 20.01 | 20.03 | 20.02 |
| Polyethyene Glycol 200 | 75.00 | 74.99 | 69.97 | 69.98 |
| Organomodified Trisiloxanes (Silicone Based) | | 5.0 | | |
| Di-2-Ethylhexyl Sulfosuccinate | 5.0 | | | |
| Polysorbate 20 (Sorbitan Derivative) | | | 10.00 | |
| Alcohol Ethoxylate/Phenolated Ethoxylates | | | | 10.00 |
| Water Content Measured | 0.89% | 0.96% | 0.42% | 0.55% |

Four formulations of ~20 wt. % S-ABA were prepared in PEG 200 containing 5-10% of various types of surfactants without the use of stabilizers and anti-oxidants by heating the S-ABA above room temperature in the co-solvents at <90° C. as set forth in Table 15 above. Accelerated Stability Testing was also performed on these solutions. The results are summarized in Table 16 below:

TABLE 16

| Amount of S-ABA (wt. %) as Measured by HPLC Assay | | | | |
| --- | --- | --- | --- | --- |
| | AG | AH | AI | AJ |
| Initial | 20.02 | 20.01 | 20.03 | 20.02 |
| Day 0 | 20.00 | 20.01 | 19.86 | 19.94 |
| 54 C./14 Days | 19.82 | 19.82 | 19.12 | 19.08 |
| % Loss from Initial | 0.98 | 0.94 | 4.54 | 4.72 |

As Table 16 illustrates, Formulation AG thru AJ, which contains high ABA concentrations and various types of surfactants showed minimal degradation of S-ABA during Accelerated Storage Stability.

Example 9: High Concentration ABA Solutions with Various Plant Growth Regulators

TABLE 17

| Ingredients (wt. %) | AK | AL | AM | AN |
| --- | --- | --- | --- | --- |
| (S)-ABA | 10.11 | 10.12 | 10.12 | 10.12 |
| Polyethyene Glycol 200 | 88.89 | 88.87 | 87.37 | 79.81 |
| Forchlorfenuron (CPPU) | 1.00 | | | |
| 6-Benzlaminopurine (6-BA) | | 1.01 | 2.51 | |
| Gibberellic Acid (GA3) | | | | 10.07 |
| Water Content Measured | 0.40% | 0.48% | 0.54% | 1.44% |

Four formulations of ~10 wt. % S-ABA were prepared in PEG 200 containing various types of plant growth regulators (PGRs) without the use of stabilizers and anti-oxidants by heating the S-ABA and plant growth regulator above room temperature in the co-solvents at <90° C. as set forth in Table 17 above. Accelerated Stability Testing was also performed on these solutions. The results are summarized in Table 18 below:

TABLE 18

| Amount of S-ABA (wt. %) as Measured by HPLC Assay | | | | |
| --- | --- | --- | --- | --- |
| | AK | AL | AM | AN |
| Initial | 10.11 | 10.12 | 10.12 | 10.12 |
| Day 0 | 10.10 | 10.12 | 10.12 | 9.97 |
| 54 C./14 Days | 9.97 | 9.96 | 9.99 | 9.95 |
| % Loss from Initial | 1.39 | 1.58 | 1.28 | 1.66 |

| Amount of Additional (wt. %) as Measured by HPLC Assay | | | | |
| --- | --- | --- | --- | --- |
| | AK (CPPU) | AL (6-BA) | AM (6-BA) | AN (GA3) |
| Initial | 1.00 | 1.01 | 2.51 | 10.07 |
| Day 0 | 1.00 | 1.01 | 2.51 | 10.07 |
| 54 C./14 Days | 0.96 | 1.01 | 2.51 | 10.05 |
| % Loss from Initial | 3.95 | 0.00 | 0.00 | 0.29 |

As Table 18 illustrates, Formulation AK thru AN, which contains high ABA concentrations and various PGRs showed minimal degradation of S-ABA and the respective PGR during Accelerated Storage Stability.

Example 10: High Concentration ABA Solutions with Various Plant Nutrients

TABLE 19

| Ingredients (wt. %) | AO | AP |
| --- | --- | --- |
| (S)-ABA | 10.35 | 10.33 |
| Polyethyene Glycol 200 | 83.98 | 88.87 |
| Boric Acid | 5.67 | |
| Sodium Molybdate | | 2.96 |
| Water Content Measured | 6.40% | 5.17% |

Two formulations of ~10 wt. % S-ABA were prepared in PEG 200 containing various types of plant nutrients without the use of stabilizers and anti-oxidants by heating the S-ABA and plant growth regulator above room temperature in the co-solvents at <90° C. as set forth in Table 19 above. Accelerated Stability Testing was also performed on these solutions. The results are summarized in Table 20 below:

TABLE 20

| Amount of S-ABA (wt. %) as Measured by HPLC Assay | | |
| --- | --- | --- |
| | AO | AP |
| Initial | 10.35 | 10.33 |
| Day 0 | 10.32 | 10.29 |
| 54 C./14 Days | 10.07 | 9.84 |
| % Loss from Initial | 2.73 | 4.71 |

As Table 20 illustrates, Formulation AO and AP, which contains high ABA concentrations and various nutrients showed minimal degradation of S-ABA and the respective PGR during Accelerated Storage Stability.

Example 11: High Concentration ABA Solutions in N,N-Dimethyl Lactamide and Co-Solvents

TABLE 21

| Ingredients (wt. %) | AQ | AR | AS | AT | AU |
|---|---|---|---|---|---|
| (S)-ABA | 30.33 | 30.35 | 30.32 | 30.34 | 30.34 |
| N,N-Dimethyl Lactamide | 62.70 | 62.70 | 62.69 | 62.71 | 62.70 |
| Polyethyene Glycol 200 | 6.97 | | | | |
| Polyethyene Glycol 300 | | 6.95 | | | |
| Polyethyene Glycol 400 | | | 6.99 | | |
| Propylene Glycol | | | | 6.95 | |
| Propylene Carbonate | | | | | 6.96 |
| Water Content Measured | 0.85% | 1.95% | 1.85% | 0.46% | 0.44% |

Five formulations of ~30 wt. % S-ABA were prepared in N,N-Dimethyl Lactamide with various co-solvents without the use of stabilizers and anti-oxidants by heating the S-ABA above room temperature in the co-solvents at <90° C. as set forth in Table 21 above. Accelerated Stability Testing was also performed on these solutions. The results are summarized in Table 22 below:

TABLE 22

Amount of S-ABA (wt. %) as Measured by HPLC Assay

| | AQ | AR | AS | AT | AU |
|---|---|---|---|---|---|
| Initial | 30.33 | 30.35 | 30.32 | 30.34 | 30.34 |
| Day 0 | 30.33 | 30.33 | 30.32 | 30.33 | 30.34 |
| 54 C./14 Days | 30.09 | 29.16 | 29.64 | 29.27 | 30.25 |
| % Loss from Initial | 0.79% | 3.86% | 2.24% | 3.49% | 0.30% |

As Table 22 shows, Formulation AQ-AU, which contains N,N-Dimethyl Lactamide and other cosolvents showed minimal degradation of S-ABA during Accelerated Storage Stability.

Example 11: High Concentration ABA Solutions in Methyl-5-Dimethylamino-2-Methyl-5-Oxopentanoate and Co-Solvents

TABLE 23

| Ingredients (wt. %) | AV | AW | AX | AY | AZ |
|---|---|---|---|---|---|
| (S)-ABA | 30.34 | 30.34 | 30.34 | 30.34 | 30.33 |
| Methyl-5-Dimethylamino-2-Methyl-5-Oxopentanoate | 62.70 | 62.70 | 62.69 | 62.71 | 62.70 |

TABLE 23-continued

| Ingredients (wt. %) | AV | AW | AX | AY | AZ |
|---|---|---|---|---|---|
| Polyethyene Glycol 200 | 6.96 | | | | |
| Polyethyene Glycol 300 | | 6.96 | | | |
| Polyethyene Glycol 400 | | | 6.97 | | |
| Propylene Glycol | | | | 6.95 | |
| Propylene Carbonate | | | | | 6.97 |
| Water Content Measured | 0.54% | 0.56% | 0.50% | 0.61% | 0.46% |

Five formulations of ~30 wt. % S-ABA were prepared in Methyl-5-Dimethylamino-2-Methyl-5-Oxopentanoate with various co-solvents without the use of stabilizers and anti-oxidants by heating the S-ABA above room temperature in the co-solvents at <90° C. as set forth in Table 23 above. Accelerated Stability Testing was also performed on these solutions. The results are summarized in Table 24 below:

TABLE 24

Amount of S-ABA (wt. %) as Measured by HPLC Assay

| | AV | AW | AX | AY | AZ |
|---|---|---|---|---|---|
| Initial | 30.34 | 30.34 | 30.34 | 30.34 | 30.33 |
| Day 0 | 30.33 | 29.96 | 30.33 | 30.27 | 30.33 |
| 54 C./7 Days | 30.29 | 29.76 | 30.16 | 30.17 | 30.27 |
| % Loss from Initial | 0.13% | 0.67% | 0.56% | 0.33% | 0.20% |

As Table 24 demonstrates, Formulation AV-AZ, which contains Methyl-5-Dimethylamino-2-Methyl-5-Oxopentanoate and other cosolvents showed minimal degradation of S-ABA during Accelerated Storage Stability.

Example 13: Performance of Current Invention in the Coloring of Grapes

As indicated, (S)-(+)-abscisic acid formulations are used commercially to encourage coloring of fruits, specifically, table grapes. An experiment was done in Los Lirios, Chile on Crimson Seedless grapes. Two applications during normal application timings (January 22 and February 5th) were done using Valent's Protone SL (10% S-ABA) vs Stoller's Experimental SL (18% S-ABA) against a water/surfactant control. The rates were adjusted to the concentration of the S-ABA in the Soluble Liquid (SL) formulation:

| Treatments | Water Content of Solution | Active Ingredient | Rate | Timing |
|---|---|---|---|---|
| Control (Water + Surfactant) | N/A | N/A | | |
| Commercial (Valent's Protone SL) | >85 wt.% | 10.05 wt, % S-ABA | 400 cc/Hectare | Berries Beginning to Touch |
| Stoller (Experimental) | 0.69 wt. % | 17.79 wt. % S-ABA | 200 cc/Hectare | Berries Beginning to Touch |

The results of the trials demonstrated a significantly higher fruit weight and berry size with the current inventive solution compared to the commercial solution. The current inventive solution did not show any statistical difference from the Control.

Results: Summary of Fruit Weight and Berry Size

| Treatments | Fruit Weight (g) | Berry Size (mm) |
|---|---|---|
| Control | 7.09 a | 19.39 a |
| Commercial | 6.2 b | 18.76 b** |
| Stoller | 7.26* a | 19.39 a |

*P-Value: <0.0001
**P Value: <0.0001

Additionally, color intensity and covering color were significantly improved using the current inventive solution over the commercial treatment.

Results: Summary of Color Intensity with Time

| | Dates | | | |
|---|---|---|---|---|
| Treatments | 22-Jan. | 28-Jan. | 5-Feb. | 5-Mar. |
| Control | 1.27 a | 2.10 a | 2.75 a | 3.21 a |
| Commercial | 1.19 a | 2.27 a | 3.10 b | 3.27 a |
| Stoller | 1.33 a | 2.77 b* | 3.67 c** | 4.33 b*** |

*P-Value: <0.0001
**P Value: <0.0001
***P Value: <0.0001
Color Intensity based on Red Globe Color Index (CIRG)

Results: Summary of Covering Color with Time

| | Dates | | | |
|---|---|---|---|---|
| Treatments | 22-Jan. | 28-Jan. | 5-Feb. | 5-Mar. |
| Control | 1.27 a | 2.00 a | 3.00 a | 4.33 a |
| Commercial | 1.20 a | 2.13 a | 3.17a | 4.23 a |
| Stoller | 1.19 a | 2.56 b* | 4.02 b** | 4.6 b*** |

*P-Value: <0.0001
**P Value: <0.0001
***P Value: <0.01
Color Covering based on the following Category Assignment:

| Category | % of Grapes Colored |
|---|---|
| 0 | 0% |
| 1 | 1-30% |
| 2 | 31-60% |
| 3 | 91-99% |
| 4 | 100% |

As shown in FIG. 1, the current invention also significantly demonstrated greater anthocyanin content in the grapes than both the commercial and control treatment.

In summary, the current invention at a lower effective dosage rate to the commercial treatment demonstrated statistically significant better fruit weight, higher color intensity, higher color coverage, and anthocyanin.

Although the present invention has been disclosed in terms of a preferred embodiment, it will be understood that numerous additional modifications and variations could be made thereto without departing from the scope of the invention as defined by the following claims:

The invention claimed is:

1. A non-aqueous liquid solution comprising:
   a) about 10 wt. % of at least one form of S-(+) abscisic acid (S-ABA);
   b) about 90 wt. % propylene glycol;
   c) optionally, 0 to about 50 wt. % of at least one non-aqueous co-solvent;
   d) optionally, 0 to about 20 wt. % at least one surfactant;
   e) optionally, additional plant growth regulator(s);
   f) optionally, additional plant nutrients;
   g) less than 0.1 wt. % antioxidant;
   h) less than 0.1 wt. % UV absorber; and
   i) ≤5 wt. % water
   wherein accelerated storage stability of the non-aqueous liquid solution at 54±2° C. for 14 days is a decline of less than 6% of the average content of S-ABA.

2. The solution of claim 1, wherein the at least one form of S-(+) abscisic acid is 2-cis, 4-trans-(S)-abscisic acid.

3. The solution of claim 1, comprising ≤2 wt. % water.

4. The solution of claim 1, wherein said UV absorber is selected from the group consisting of benzophone-3, ethylhexyl methoxycinnamate, and mixtures thereof.

5. The solution of claim 4, wherein said UV absorber is benzophone-3.

6. The solution of claim 4, wherein said UV absorber is ethylhexyl methoxycinnamate.

7. The solution of claim 1, wherein said antioxidant is selected from the group consisting of t-butylhydroquinone (TBHQ), propyl gallate, clove oil, ethoxyquin, and mixtures thereof.

8. The solution of claim 7, wherein said antioxidant is t-butylhydroquinone (TBHQ).

9. The solution of claim 1, comprising <1 wt. % water.

* * * * *